Dec. 5, 1967  P. S. WHITE, JR  3,356,297
SLIDE RULE CALCULATOR FOR MISSILE CAPSULE
Filed Nov. 24, 1965  2 Sheets-Sheet 1

PAUL S. WHITE, Jr.
INVENTOR

Claude Funkhouser
ATTORNEY

Dec. 5, 1967   P. S. WHITE, JR   3,356,297
SLIDE RULE CALCULATOR FOR MISSILE CAPSULE
Filed Nov. 24, 1965   2 Sheets-Sheet 2

PAUL S. WHITE, Jr.
INVENTOR

BY Claude Funkhouser
ATTORNEY

United States Patent Office 3,356,297
Patented Dec. 5, 1967

3,356,297
SLIDE RULE CALCULATOR FOR MISSILE CAPSULE
Paul S. White, Jr., Rockville, Md., assignor to the United States of America as represented by the Secretary of the Navy
Filed Nov. 24, 1965, Ser. No. 510,144
2 Claims. (Cl. 235—78)

ABSTRACT OF THE DISCLOSURE

The present invention relates to a calculator for determining go no-go limits within which solutions to missile fire control error equations and test instrumentation readings must conform to indicate proper operability of missile fire control subsystems. The calculator comprises a pair of face plates and a reference card inserted between the plates and upon which is recorded nominal values of missile guidance constants. The face plates are provided with linear scales thereon and a slidably mounted cursor having a hairline selectively positionable to a nominal value on the scales and a pair of slide index limits indicating go no-go limits on the scales. The calculator also includes a pair of concentric discs mounted on the face plates. One of the discs is provided with drift limit scales and the other disc is provided with a series of windows through which may be viewed go no-go limits on the drift limit scales. One of said discs is provided with a scale factor variable scale which is utilized, together with a linear scale on the face plates, to obtain solutions to missile fire control error equations.

---

This invention generally relates to a device for use in testing the operability and performance of missile guidance component circuitry. More specifically, the invention relates to a calculator for determining go no-go indications which define the limits within which test instrumention readings must conform.

A test subsystem has been developed to perform maintenance checks upon missile and fire control subsystems located on board a submarine or other launching vessel. The heart of the subsystem is the ITOP (Integrated Test and Operating Panel). The ITOP is designed to allow testing of missile and fire control subsystems by a pushbutton operation. In the operation of the test subsystem, an operator selects a particular test to be run and a particular missile and channel to be tested. When the selected pushbuttons are depressed, information is fed to the subsystem being tested and decimal or octal readout information, as required, is indicated by ITOP test instrumentation. The readout results of a particular test vary because each missile loaded on the launching vessel possesses individual guidance characteristics (nominal values), and because of other variables, such as the earth's rate of angular velocity (earth rate) for a particular latitude and the value and direction of the local acceleration of gravity. The calculator of the present invention determines limits within which the test instrumentation meter readings must conform in order to indicate the proper operation of the subsystem being tested. Through use of the calculator, many hours of hand calculations are eliminated and immediate indications of permissible test instrumentation readings are made available.

It is, therefore, an object of the invention to provide an improved calculator for quickly determining go no-go limits for indicating proper operability of missile and fire control subsystems.

A further object of the present invention is to provide a means for recording nominal values of missile guidance constants and for utilizing them in test indications.

A still further object of the present invention is to provide a calculator for determining whether or not troubleshooting of missile and fire control subsystems is necessary.

Other objects and many of the attendant advantages of this invention will be readily appreciated as the same becomes better understood by reference to the drawings, wherein.

Figure 1:
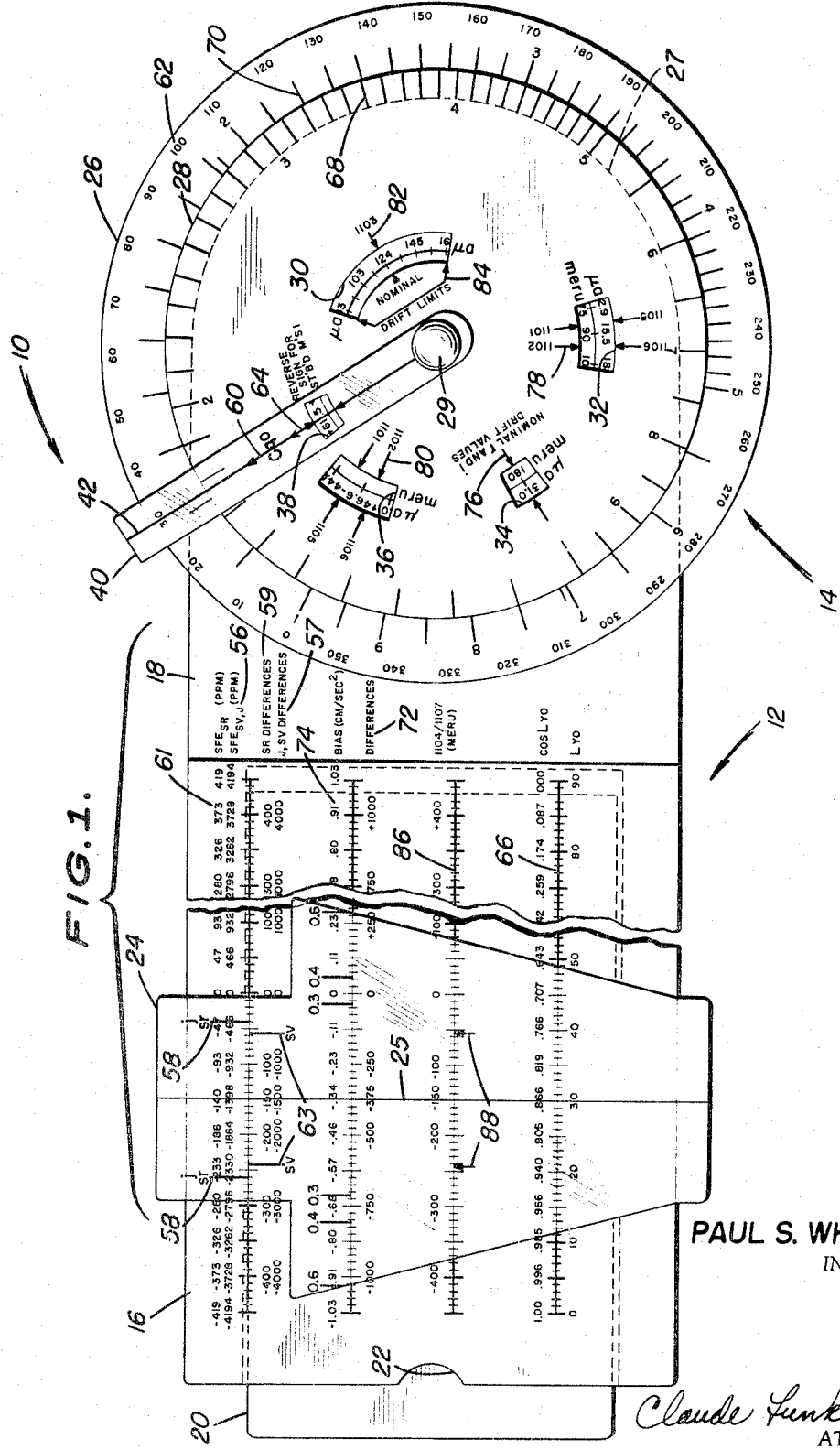
FIG. 1 is a plan view of the front face of a calculator according to the present invention.
Figure 3:
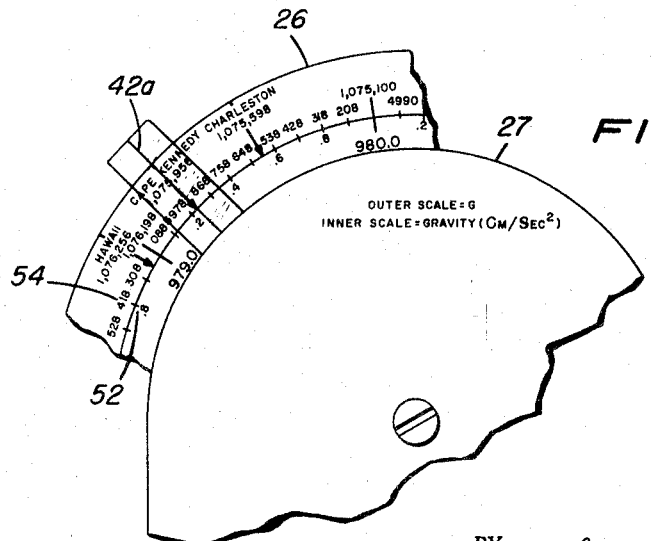
FIG. 3 is a detail plan view of the rear face of the circular portion of the calculator.

With more particular reference to the drawings, the calculator constituting the present invention is shown generally at 10 and comprises a generally rectangular linear portion 12 and a circular portion 14. The linear portion 12 is comprised of two spaced face plates 16 and 17, of aluminum or other suitable material, which are attached to opposite sides of a backing plate 18. The face plates 16 and 17 provide, respectively, an obverse and reverse surface upon which scale markings can be inscribed or printed by any well-known process. The backing plate 18 is partially cut away between the face plates 16 to define a slot, so that a reference card 20 can be inserted between said plates. Thumb and finger notches 22 are provided in the face plates 16 and 17 to permit easy removal of the reference card 20. A cursor member 24, of transparent material and having hairlines 25 and 25a, is mounted to slide on the linear portion 12 for use with the scale markings appearing on the face plates 16 and 17. The circular portion 14 of the calculator 10 includes a relatively large disc 26 and a relatively small disc 28. The discs 26 and 28 are mounted on the same axis, with the disc 28 overlying the disc 26, and are pivotally connected to an extension 27 of the backing plate 18 by a pin 29. As shown in FIGS. 1 and 3, the disc 26 has scale markings on both its obverse and reverse faces. The disc 28 is provided with a plurality of semi-circular windows 30, 32, 34, 36, and 38 which register with certain scale markings on the obverse face of the disc 26, in a manner to be explained. A cursor member 40, of transparent material and having hairlines 42 and 42a is pivotally connected to the discs 26 and 28 by the pin 29 and straddles both of said discs for use with the scale markings on the discs 26 and 28.

The purpose of the calculator 10 is to determine, for a given test instrumentation meter reading, the permissive limits within which the reading should appear to indicate proper functioning of the missile or fire control circuit being tested. For each test, meter readings are taken along three mutually perpendicular axes of the missile. The axes are defined as follows: the "V" axis is the Missile Vertical Reference Axis; the "R" axis is the Missile Horizontal Reference Axis; and the "J" axis is the Missile Guidance Cross Reference Axis. Additional axes are defined for the missile guidance capsule alignment, i.e., the "SR" axis is the Missile Slant Horizontal Reference Axis and the "SV" axis is the Missile Slant Vertical Reference Axis. The tests performed are for subsystem circuits which control missile erection and alignment as defined by each of the above-mentioned axes. Each of the tests is designated by a number for identification by the test operator. For example, the Earth Rate Test for the "R" axis circuitry is designated by the test number 0308 (scale 44 on the face plate 17). Similarly, 0309, on scale 48, designates the Earth Rate Test for the "J" axis circuitry and 0815, on scale 50, designates the Earth Rate Test for the "V" alignment axis. The 0308 test is performed by operation of the 0308 test pushbutton on the test instrumentation equipment and observation of the resultant meter reading. The observed meter reading is then checked against the go no-go values indicated on the calculator scale readings, as will be described hereinafter. If the subsystem is not properly functioning, the observed meter reading will vary from the permissible go no-go values. Troubleshooting of the subsystem is then necessary to determine the malfunction.

Figure 2:
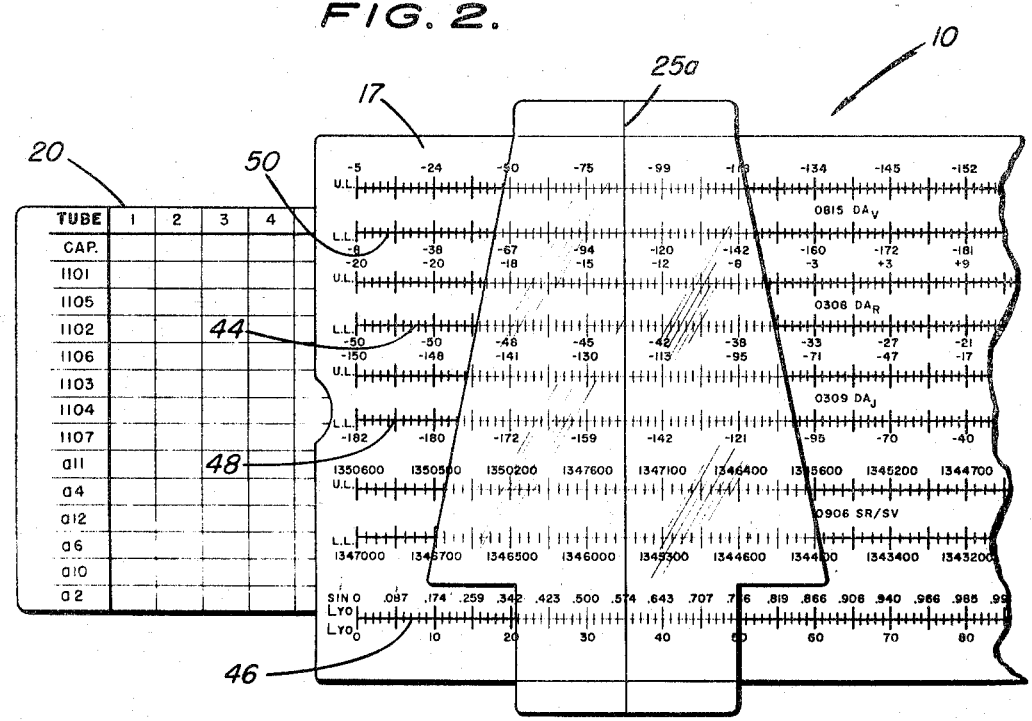
FIG. 2 is a detail plan view of the rear face of the linear portion of the calculator, and showing also the reference card upon which nominal values of missile guidance constants can be recorded.

As shown in FIG. 2, the scale 44, located on the reverse side of the calculator 10, gives the go no-go limits i.e., the upper limit (U.L.) and the lower limit (L.L.) for the observed 0308 meter reading. The 0308 signal being measured is the "R" axis alignment signal ($DA_R$), resolved from the effect of the earth's angular velocity upon the "R" axis circuitry. The limits (U.L.) and (L.L.) will varry according to the earth's angular velocity for different latitude locations of the launching vessel. Thus, the cursor hairline 25a is set to the actual latitude of the vessel's location as found in the Lyo scale and the limits (U.L.) and (L.L.) are read under the hairline on the ($DA_R$) scale 44. If the launching vessel were located at a latitude of 30°, for example, the cursor hairline 25 is set to "30" on the Lyo scale and the ($DA_R$) meter reading must be between −15 μa. (U.L.) and −45 μa. (L.L.) as shown on scale 44, for a successful test operation. The Lyo scale indicates the value of ship's latitude. As shown on scale 48, go no-go values of the Earth Rate Test (0308) for the "J" axis ($DA_J$), should be between the values of −130 μa. and −159 μa.for a latitude of 30°. On scale 50 the limits for the Earth Rate Test (0815) about the "V" axis ($DA_V$), should be between −75 μa. and −94 μa. for a test pass indication. If the meter reading is not within the limits indicated on the appropriate scale readings on the calculator, the test fails and the subsystem being tested is not properly functioning.

Another series of tests are the Accelerometer Tests. In the performance of these tests the (0901) and (0902) octal readouts are observed. Such readouts are located on the ITOP along with other test instrumentation. From the (0901) and (0902) octal readouts the accelerometer scale factor error and the accelerometer bias values can be calculated and then compared against the appropriate go no-go scale readings on the calculator. The respective accelerometer scale factor errors are calculated from the following decimal reading differences equations:

(1) $SFE_J = ITOP_{10}(0901) + ITOP_{10}(0902) - G_X$
(2) $SFE_{SV} = ITOP_{10}(0908) - ITOP_{10}(0909)$
(3) $SFE_{SR} = ITOP_{10}(0907) + ITOP_{10}(0910) - G_X - C$

The value of the decimal reading equation for the "J" axis accelerometer ($SFE_J$) is found by adding the decimal converted (0901) reading of the ITOP to the (0902) decimal converted reading and subtracting the value of $G_X$, a scale factor variable. Values of $G_X$ vary inversely with the acceleration of gravity at the launching vessel's location. FIG. 3 partially shows scales 52 and 54 located on the reverse side of the disc 26. $G_X$ can be found by locating the cursor hairline 42 over the indicated value of "GRAVITY" on scale 52, then reading the corresponding $G_X$ values on the scale 54. The correct values of "GRAVITY" are obtained from memory or from readily available reference tables.

To find the go no-go limits for the $SFE_J$ test, a $SFE_J$ scale 56, on the obverse side of the calculator, is employed. The nominal value of missile guidance constant $a.11$ is taken from the reference card 20 and is located under the cursor hairline 25 on the scale 56. The nominal value of $a.11$ is the laboratory value of the "J" accelerometer scale factor error. A pair of slide index limits 58, marked on the cursor 24, indicate on the $J_{SV}$ differences scale 57 the go no-go limits for the $SFE_J$ meter reading differences equation. For a test pass, the value of $SFE_J$, obtained from Equation 1 above, must fall between the go no-go limits on the $J_{SV}$ differences scale 57, as indicated by the slide index limits 58.

The value of the meter reading equation for the "SR" axis accelerometer is obtained from Equation 3, above wherein $C = A \cos Lyo$, when a test is conducted for port missiles. When a test is conducted for starboard missiles, the sign of $A \cos Lyo$ is reversed. The value of A, a scale factor variable, is found in the following manner. A pointer index 60, located on the disc 28, is set to the value of ship's heading (Cqo), marked in degrees on the outermost scale 62 of the disc 26. The value of A is observed through a window 38 on the disc 28, as indicated by a pointer 64. The value of cos Lyo is obtained on a scale 66 of the linear portion 12 by placing the hairline 25 of the cursor 24 over the reading of the launching vessel's latitude (Lyo) and observing its corresponding cosine. A pair of logarithmic scales 68 and 70, located on the outer periphery of the disc 28 and the adjacent inner periphery of the disc 26, respectively, are then utilized in the multiplication of A and cos Lyo, which equals C.

For a test pass, the value of $SFE_{SR}$, obtained from Equation 3, above, must fall between the vaues indicated on the SR differences scale 59 by the slide index limits 58. The cursor hairline 25 is set to the nominal value of guidance constant $a.10$ which is taken from the reference card 20 and located on the $SFE_{SR}$ scale 61. The value of a $a.10$ is the laboratory value of the SR accelerometer scale factor error.

The go no-go limits for the $SFE_{SV}$ test are found on the SV,J differences scale 61 by positioning the cursor hairline to the nominal value of guidance constant $a.12$ on the $SFE_{SV,J}$ scale 56. A second pair of slide index limits 63 on the cursor 24 indicates the go no-go limits on the scale 61 for a $SFE_{SV}$ test pass.

The accelerometer bias tests are conducted by using the same test octal readings used in the decimal reading differences equations, above. The decimal reading differences equations governing the accelerometer bias values are as follows:

$BIAS_J = ITOP_{10}(0901) - ITOP_{10}(0902)$
$BIAS_{JV} = ITOP_{10}(0908) - ITOP_{10}(0909)$
$BIAS_{SR} = ITOP_{10}(0910) - ITOP_{10}(0907)$

Values for the differences equations are calculated by substituting in the proper equation the converted octal to decimal readings. The go no-go limits for the values obtained thereby are found on a differences scale 72 as follows: the laboratory value of the "J" accelerometer bias is given by the nominal value of guidance constant A4, taken from the reference card 20. The cursor hairline 25 is positioned to the nominal value of A4 on a BIAS scale 74. A third pair of slide index limits marked "0.4" on the cursor 24 indicate on the scale 72 the go no-go limits for the "J" bias meter reading equation.

In a similar manner, the cursor hairline 25 is positioned to the nominal value of guidance constant $a.6$ on the BIAS scale 74. A fourth pair of slide index limits marked "0.6" on the cursor 24 indicate on the scale 72 the go no-go limits for the SV bias meter reading equation.

In a similar manner, the cursor hairline is positioned to the nominal value of guidance constant $a.2$ on the BIAS scale 74. A fifth pair of slide index limits marked "0.3" on the cursor 24 indicate on the scale 72 the go no-go limits for the SR bias meter reading equation.

A series of tests are performed upon the guidance capsule gyros to determine their drift rates. On the reference card 20, the nominal values 1101 through 1107 are the laboratory drift rate values of the gyros. The numbers 1101–1107 also represent the particular test numbers. To obtain go no-go limits for the tests numbered 1101, 1102, 1105, and 1106, an index 76 marked "nominal R and J drift values" is set to the nominal value in microamperes or merus on a particular gyro drift rate scale as viewed through the window 34. The drift rate scale is marked on the disc 26 in a circular configuration so that rotation of the disc 28 will position the window 34 over different values of the drift rate. With the index 76 in the same position, the upper and lower limits of drift rate for the particular test are read on the same drift rate scale as observed in the windows 32 and 36. For example, if test 1102 is selected the nominal value 180 meru, of the gyro drift 1102, is found on the reference card 20. The index 76 is positioned to "180 meru" on the gyro drift rate scale, as viewed through window 34, and the go no-go drift rate limits are thus found on the drift rate scale in window 32 as approximately 100 meru by the position of an index 78, and i nwindow 36 as approximately 45 μa. by the position of an index 80. The go no-go drift rate limits for test number 1103 are determined by positioning an index 82 to the nominal value of guidance constant 1103 on a second drift rate scale, concentric with said first drift rate scale, as viewed in the window 30 and reading the go no-go limits within the window 30 by the positions of indices 84. Rotation of the disc 28 with respect to the disc 26 will position the window 30 over different values of the second drift rate scale.

Go no-go limits for tests 1104 and 1107 are determined by placing the cursor hairline 25 to the nominal values therefor on a scale 86 marked 1104/1107 on the linear portion 12 of the calculator 10. A sixth pair of slide index limits 88 on the cursor 24 indicate the go no-go limits for the particular test 1104 or 1107.

It is to be understood that the calculator does not indicate precise values of expected test meter readings. However, by its proper use, go no-go results for the various tests performed can be quickly determined. Many hours of tedious hand calculations are therefore eliminated.

Obviously many modifications and variations of the present invention are possible in the light of the above teachings. It is therefore to be understood that within the scope of the appended claims the invention may be practiced otherwise than as specifically described.

What is claimed is:
1. A calculator for obtaining go no-go limits for fire control error equations applicable to a missile fired from a launching vessel, the combination comprising,
   a first disc having a circular launching vessel headscale at its outer periphery,
   a second disc of smaller diameter than said first disc and adjustable concentrically thereon and having a pointer index for registration with a prescribed value on said vessel heading scale,
   a circular scale factor variable scale on said first disc, said second disc having adjacent to said pointer index a window for viewing a scale factor variable corresponding to said prescribed value on said launching vessel heading scale,
   a pivotable cursor straddling said discs and mounted pivotally at the centers of said discs,
   a first logarithmic scale on the outer periphery of said second disc,
   a second logarithmic scale on said first disc and cooperating with said first logarithmic scale and said pivotable cursor to obtain a multiple for use in a solution to a missile fire control error equation,
   a second drift limit scale about the center of said first disc,
   a first window provided on said second disc and positionable to a nominal value of said second drift limit scale,
   a second window provided on said second disc through which an upper limit of said second drift limit scale may be viewed, and
   a third window provided on said second disc through which a lower limit of said second drift scale may be viewed.
2. The calculator of claim 1, wherein
said first disc has on its reverse side a circular acceleration of gravity scale corresponding to launching vessel location and a circular scale factor variable scale adjacent to said acceleration of gravity scale and having values dependent upon the indicated values on said acceleration of gravity scale, and
said pivotal cursor having a hairline selectively positionable to a value on said acceleration of gravity scale and for indicating a corresponding value of a scale factor variable.

References Cited

UNITED STATES PATENTS

| | | | |
|---|---|---|---|
| 556,719 | 3/1896 | Stewart | 235—89 |
| 1,405,598 | 2/1922 | Kramer | 235—83 |
| 2,425,097 | 8/1947 | Isom | 235—84 |
| 2,486,913 | 11/1949 | Bessiere | 235—70 |
| 2,683,946 | 7/1954 | Olson | 235—70.2 |
| 2,953,289 | 9/1960 | Peterkin | 235—78 |
| 2,967,016 | 1/1961 | Gray | 235—78 |
| 3,131,858 | 5/1964 | Warner | 235—78 |
| 3,232,531 | 2/1966 | Hodge | 235—89 |

FOREIGN PATENTS

| | | |
|---|---|---|
| 457,085 | 11/1936 | Great Britain. |
| 533,945 | 12/1921 | France. |

RICHARD B. WILKINSON, *Primary Examiner.*
STANLEY A. WAL, *Assistant Examiner.*